(12) United States Patent
Fujiwara (10) Patent No.: US 8,717,646 B2
(45) Date of Patent: May 6, 2014

(54) IMAGE READING DEVICE CAPABLE OF PERFORMING ROTATION PROCESS ON READ IMAGE APPROPRIATELY

(71) Applicant: Shingo Fujiwara, Nagoya (JP)

(72) Inventor: Shingo Fujiwara, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 13/801,807

(22) Filed: Mar. 13, 2013

(65) Prior Publication Data
US 2013/0286449 A1 Oct. 31, 2013

(30) Foreign Application Priority Data
Apr. 27, 2012 (JP) .................................. 2012-103036

(51) Int. Cl.
*H04N 1/04* (2006.01)
(52) U.S. Cl.
USPC ............ 358/498; 358/497; 358/496; 358/474
(58) Field of Classification Search
USPC .................................. 358/498, 497, 496, 474
See application file for complete search history.

(56) References Cited

U.S. PATENT DOCUMENTS

| 6,271,935 | B1 * | 8/2001 | Cook .............................. 358/1.9 |
| 6,298,157 | B1 * | 10/2001 | Wilensky ....................... 382/199 |
| 6,999,209 | B2 * | 2/2006 | Kelly et al. .................... 358/474 |
| 7,206,104 | B2 * | 4/2007 | Lee ................................ 358/488 |

FOREIGN PATENT DOCUMENTS

| JP | 2000-155444 A | 6/2000 |
| JP | 2005-155444 A | 6/2000 |
| JP | 2001-282049 A | 10/2001 |
| JP | 2006-174372 A | 6/2006 |

* cited by examiner

*Primary Examiner* — Houshang Safaipour
(74) *Attorney, Agent, or Firm* — Scully, Scott, Murphy & Presser, PC (57) ABSTRACT

An image reading device conveys a first sheet and second sheet in a conveying direction. The first sheet has short sides extending in the conveying direction and long sides extending in a main scanning direction. The second sheet has long sides extending in the conveying direction and short sides extending in the main scanning direction. The image reading device reads an image on a sheet at a reading position and detects the sheet at a detecting position. A distance between the reading position and the detecting position is smaller than a difference between the short side of first sheet and the long side of second sheet. The image reading device rotates the read image if a sheet is not detected when the predetermined length worth of image is read. The read image is not rotated if a sheet is detected when the predetermined length worth of image is read.

10 Claims, 8 Drawing Sheets

| CORRESPONDENCE TABLE | | | EXECUTING ROTATION CONTROL OR NOT | | |
|---|---|---|---|---|---|
| MAIN SCAN WIDHT | READ LENGTH | REAR SENSOR | CANDIDATE FOR SIZE OF SHEET | | CROTATION CONTROL |
| 148mm | 105mm | OFF | A6 LATITUDINAL | | 90° |
| | | ON | A5 LONGITUDINAL | | 0° |
| 182mm | 128mm | OFF | B6 LATITUDINAL | | 90° |
| | | ON | B5 LONGITUDINAL | | 0° |
| 210mm | 148mm | OFF | A5 LATITUDINAL | | 90° |
| | | ON | A4 LONGITUDINAL | | 0° |
| 257mm | 182mm | OFF | B5 LATITUDINAL | | 90° |
| | | ON | B4 LONGITUDINAL | | 0° |
| 279.4mm | 215.9mm | OFF | LETTER LATITUDINAL | | 90° |
| | | ON | TABLOID LONGITUDINAL | | 0° |
| 297mm | 210mm | OFF | A4 LATITUDINAL | | 90° |
| | | ON | A3 LONGITUDINAL | | 0° |

FIG. 8

IMAGE READING DEVICE CAPABLE OF PERFORMING ROTATION PROCESS ON READ IMAGE APPROPRIATELY

CROSS REFERENCE TO RELATED APPLICATION

This application claims priority from Japanese Patent Application No. 2012-103036 filed Apr. 27, 2012. The entire content of the priority application is incorporated herein by reference.

TECHNICAL FIELD

The present invention relates to an image reading device.

BACKGROUND

An image-reading device known in the art has a conveying path along which sheets of an original are conveyed, and an image-reading unit that reads images from the sheets as the sheets pass through a read position on the conveying path. This type of image-reading device can convey sheets of various sizes, such as A4 and A3 sizes, and in different orientations along the conveying path. For example, the image-reading device can convey an A4-size sheet in a latitudinal orientation (sideways) in which the short sides are parallel to the conveying direction, and a longitudinal orientation (lengthwise) in which the long sides are parallel to the conveying direction.

SUMMARY

Images formed on the sheet (original image) include portrait images oriented in a direction parallel to the long sides of a sheet, and landscape images oriented in a direction parallel to the short sides of a sheet.

When a sheet having an image in portrait orientation is conveyed in the latitudinal orientation, the image-reading unit sequentially reads the portrait image from left to right or right to left and stores the scan data in memory. Consequently, when the image read from the sheet is displayed on a display device based on this stored data, the orientation of the displayed image is offset (rotated) 90 degrees from the orientation of the display device. Accordingly, the image is not displayed in a user-friendly orientation. Hence, when a sheet having a portrait image is conveyed in the latitudinal orientation, it is desirable to perform a rotation process on the image acquired by the image-reading unit. It is similarly desirable to perform the rotation process on an image acquired by the image-reading unit when the image formed on the sheet is in landscape orientation and the sheet was conveyed in the longitudinal orientation.

In order to reduce the time required to complete this rotation process after the image-reading unit begins reading the image from a sheet conveyed in the latitudinal orientation, it is conceivable to execute the rotation process on the scanned image in parallel with the reading process. However, if any of the settings indicating whether the sheet is being conveyed in the longitudinal or latitudinal orientation and whether the size of the sheet is A4-size or A3-size is incorrect, the following problems may occur when using the parallel method. The rotation process on the scanned image could be mistakenly omitted when an A4-size sheet is conveyed in the latitudinal orientation, and the rotation process could be mistakenly performed when an A3-size sheet is conveyed in the longitudinal orientation, for example.

In view of the foregoing, it is an object of the invention to provide an image-reading device that reduces the possibility of the rotation process being executed inappropriately, even when settings for the size and orientation of the sheet of original are incorrect or nonexistent.

In order to attain the above and other objects, the invention provides an image reading device including a conveying unit, a reading unit, a sheet-detecting unit, and a control unit. The conveying unit is configured to convey a first sheet and a second sheet along a conveying path in a conveying direction. The first sheet has short sides extending in the conveying direction and long sides extending in a main scanning direction perpendicular to the conveying direction. The second sheet has long sides extending in the conveying direction and short sides extending in the main scanning direction. The conveying path has a reading position and a detecting position upstream of the reading position in the conveying direction. A distance between the reading position and the detecting position is smaller than a difference between the short side of the first sheet and the long side of the second sheet. The reading unit is configured to read an image formed on a sheet having reached the reading position. The sheet-detecting unit is configured to detect the sheet having reached the detecting position. The control unit is configured to control the reading unit to read the image formed on the sheet being conveyed to generate a read image. The control unit is further configured to determine whether or not a predetermined length worth of the image has been read. The control unit is further configured to rotate the read image in one of: a first case where the detecting unit fails to detect a sheet when the control unit determines that the predetermined length worth of the image has been read; and a second case where the detecting unit detects the sheet when the control unit determines that the predetermined length worth of the image has been read. The read image is not rotated in another of the first case and the second case.

According to another aspect, the present invention provides a non-transitory computer readable medium storing a set of program instructions executed by an image reading device. The program instructions include: controlling a reading unit to read an image formed on a sheet being conveyed by a conveying unit and reached to a reading position to generate a read image, the conveying unit being configured to convey a first sheet and a second sheet along a conveying path in a conveying direction, the first sheet having short sides extending in the conveying direction and long sides extending in a main scanning direction perpendicular to the conveying direction, the second sheet having long sides extending in the conveying direction and short sides extending in the main scanning direction, the conveying path having the reading position and a detecting position upstream of the reading position in the conveying direction, a distance between the reading position and the detecting position being smaller than a difference between the short side of the first sheet and the long side of the second sheet; determining whether or not a predetermined length worth of the image has been read; detecting whether or not a sheet is present at the detecting position; and rotating the read image in one of: a first case where a sheet is not detected when the predetermined length worth of the image has been read; and a second case where the sheet is detected when the predetermined length worth of the image has been read, the read image being not rotated in another of the first case and the second case.

BRIEF DESCRIPTION OF THE DRAWINGS

The particular features and advantages of the invention as well as other objects will become apparent from the following description taken in connection with the accompanying drawings, in which.

DETAILED DESCRIPTION

First Embodiment

Next, a multifunction peripheral (MFP) 1 according to a first embodiment of the present invention will be described while referring to FIGS. 1 through 7. The MFP 1 is an example of an image-reading device that has a plurality of functions, including a scanning function and copying function.

Electrical Structure of the MFP

Figure 1:
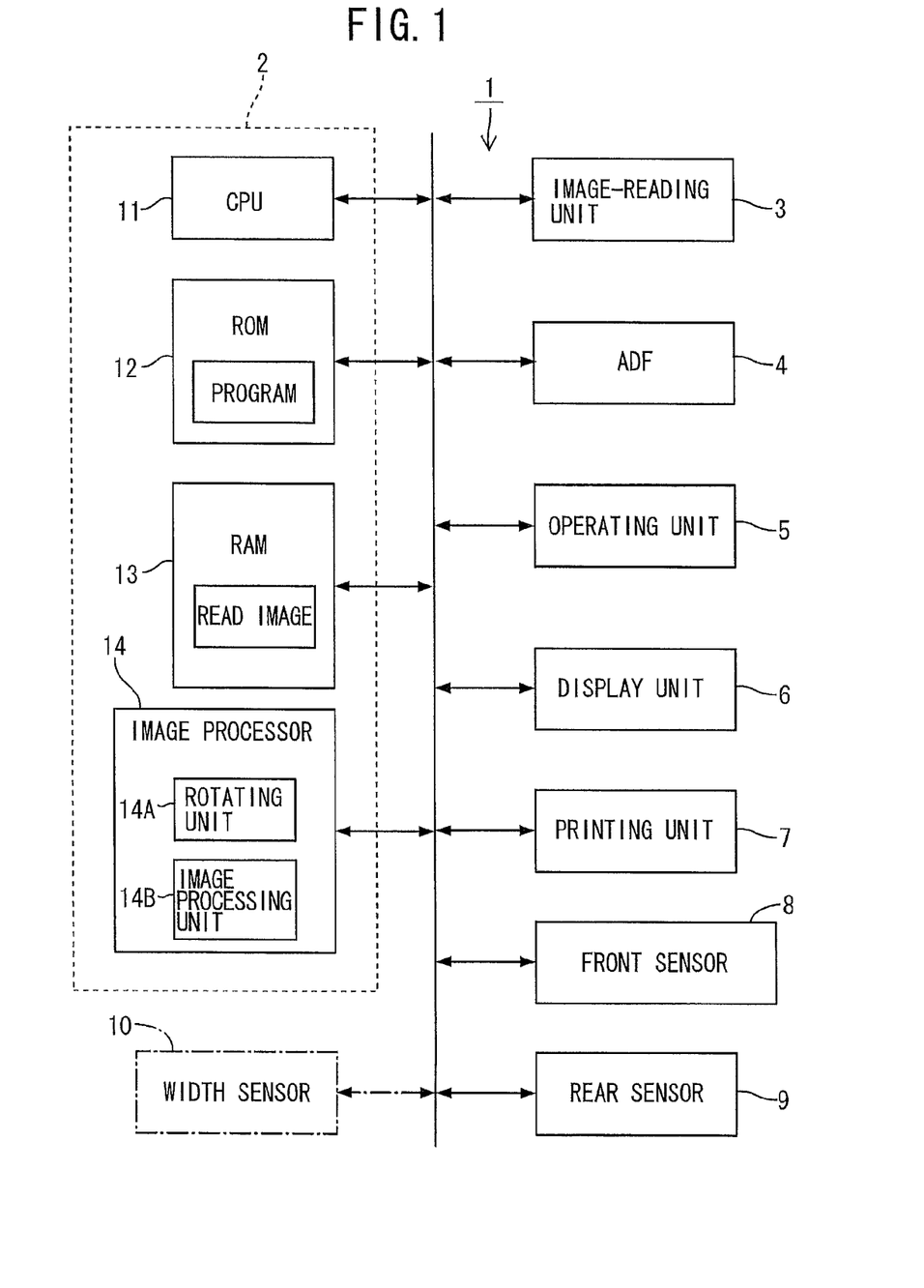
FIG. 1 is a block diagram showing an image reading device according to a first embodiment of the present invention.

As shown in FIG. 1, the MFP 1 includes a control unit 2, an image-reading unit 3, an automatic document feeder (ADF) 4, an operating unit 5, a display unit 6, a printing unit 7, a front sensor 8, and a rear sensor 9.

The control unit 2 also possesses a central processing unit (CPU) 11, a ROM 12, a RAM 13, and an image processor 14. The ROM 12 stores a program for executing a read control process described later, programs for executing various operations on the MFP 1, and the like. The CPU 11 controls the components of the MFP 1 based on programs read from the ROM 12. The various programs mentioned above may be stored on a medium other than the ROM 12 or RAM 13, including nonvolatile memory, such as a CD-ROM, hard disk drive, or flash memory (registered trademark).

The RAM 13 stores various data including scan data comprising data for pixel rows corresponding to the image scanned by the image-reading unit 3. The image processor 14 is a hardware circuit that includes a rotating unit 14A for executing a rotation process on the image read by the image-reading unit 3, and an image-processing unit 14B for executing image processes on the scanned image, such as color conversion and gamma correction. The operating unit 5 includes a plurality of buttons that enable the user to perform input operations. The display unit 6 has a liquid crystal display, LED lamps, and the like for displaying various option screens and the operating status of the device, for example. The printing unit 7 prints images based on the scan data or other image data on blank sheets (not shown) according to an electrophotographic or inkjet method, for example. The image-reading unit 3, ADF 4, front sensor 8, and rear sensor 9 will be described later.

Figure 2:
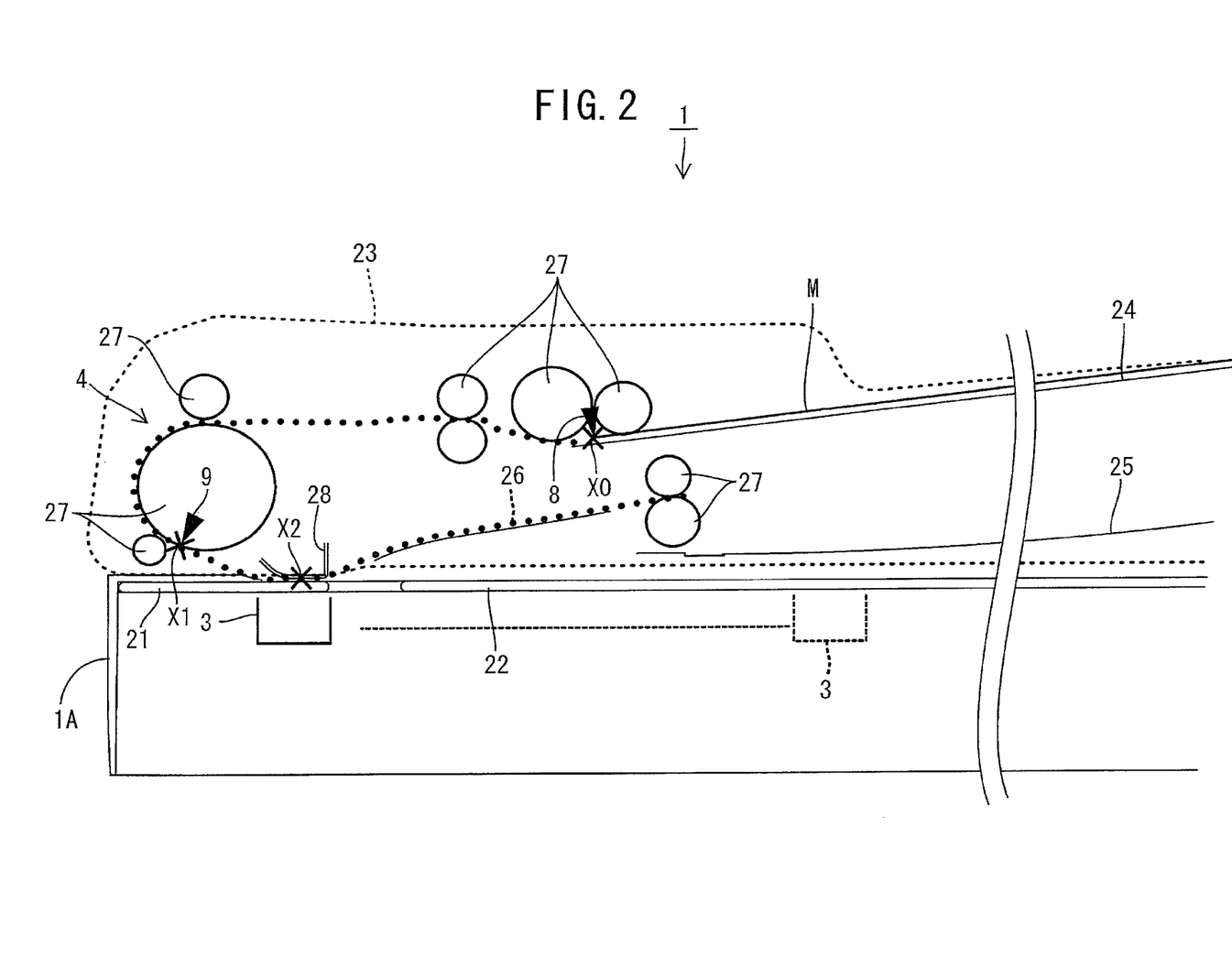
FIG. 2 is a cross-sectional diagram showing the image reading device according to the first embodiment of the present invention.

As shown in FIG. 2, the MFP 1 has a body casing 1A accommodating the printing unit 7 and the image-reading unit. On the top surface of the body casing 1A are provided an ADF glass 21, and a flatbed glass 22. A cover 23 is provided on the top surface of the body casing 1A for covering the ADF glass 21 and flatbed glass 22 and is capable of opening and closing about one edge of the body casing 1A. The ADF 4, front sensor 8, and rear sensor 9 described above are provided inside the cover 23, and the image-reading unit 3 is provided below the ADF glass 21.

The cover 23 is also provided with a first tray 24 for supporting sheets M of an original to be scanned, and a second tray 24 disposed below the first tray 24 and receiving the sheets M after the scanning operation is performed. The front sensor 8 is provided on one end of the first tray 24 at a detection position X0. The front sensor 8 detects the presence of sheets M in the first tray 24 and transmits these detection results to the control unit 2.

A conveying path 26 is formed inside the cover 23. The conveying path 26 is U-shaped and serves to convey the sheets M from the first tray 24 to the second tray 24. A plurality of conveying rollers 27 and a pressing member 28 are disposed along the conveying path 26. The conveying rollers 27 are driven to rotate in order to convey the sheets M along the conveying path 26.

The image-reading unit 3 is a reading device possessing a compact image sensor (CIS). The image-reading unit 3 includes a plurality of reading elements arranged in a line extending orthogonal to the surface of the drawing in FIG. 2 (this direction will be called the "main scanning direction"), and a plurality of RGB light sources arranged near the reading elements. Note that the image-reading unit 3 may be configured of a charge-coupled drive (CCD) image sensor and is not limited to a CIS. Further, a moving mechanism (not shown) is provided for moving the image-reading unit 3 left and right in FIG. 2 along a path parallel to the ADF glass 21 and flatbed glass 22.

The moving mechanism moves the image-reading unit 3 to a position directly beneath the pressing member 28 for reading a sheet M conveyed by the ADF 4. The image-reading unit 3 reads an image formed on the sheet M and transmits scan data corresponding to the image to the control unit 2. The read position X2 shown in FIG. 2 denotes the position on the conveying path 26 between the pressing member 28 and the image-reading unit 3. The rear sensor 9 is disposed upstream of the read position X2 at a detection position X1. The rear sensor 9 detects the presence of a sheet M approaching the read position X2 and transmits these detection results to the control unit 2.

Orientations of Image and Sheet

Figure 3:
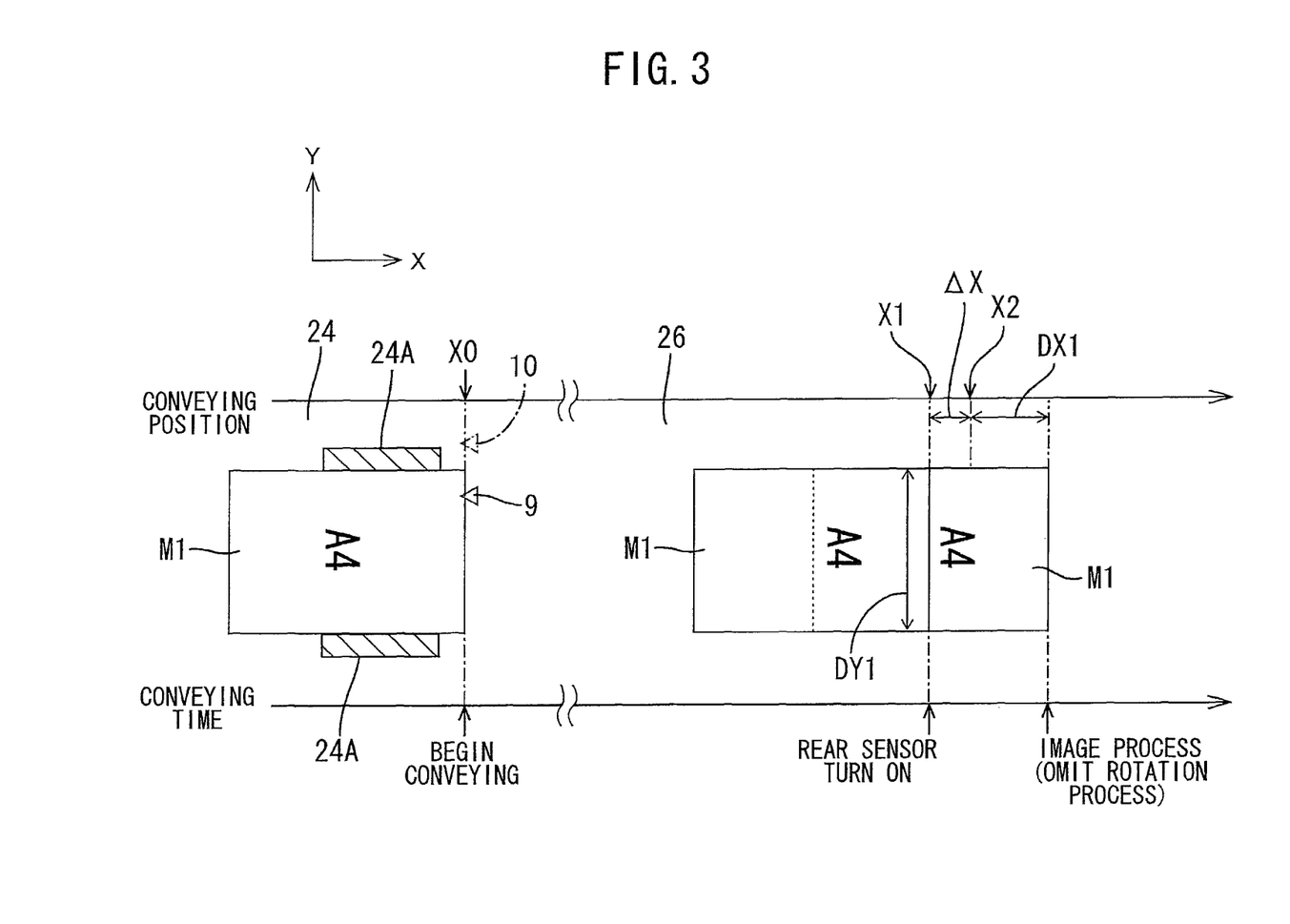
FIG. 3 is an explanatory diagram showing relationships between conveyance positions and conveyance times of A4-size sheet where of the A4-size sheet is arranged in a longitudinal orientation.
Figure 4:
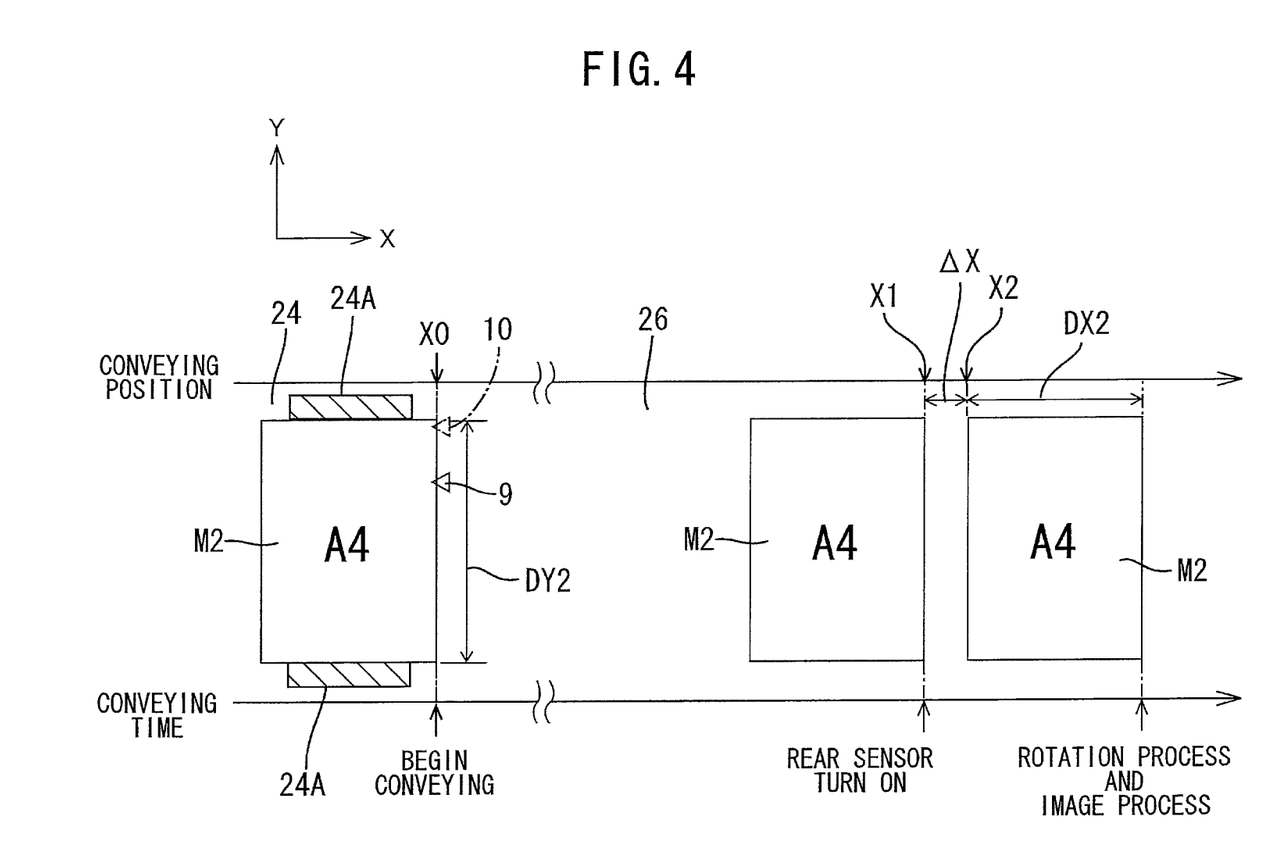
FIG. 4 is an explanatory diagram showing relationships between conveyance positions and conveyance times of A4-size sheet where of the A4-size sheet is arranged in a latitudinal orientation.
Figure 5:
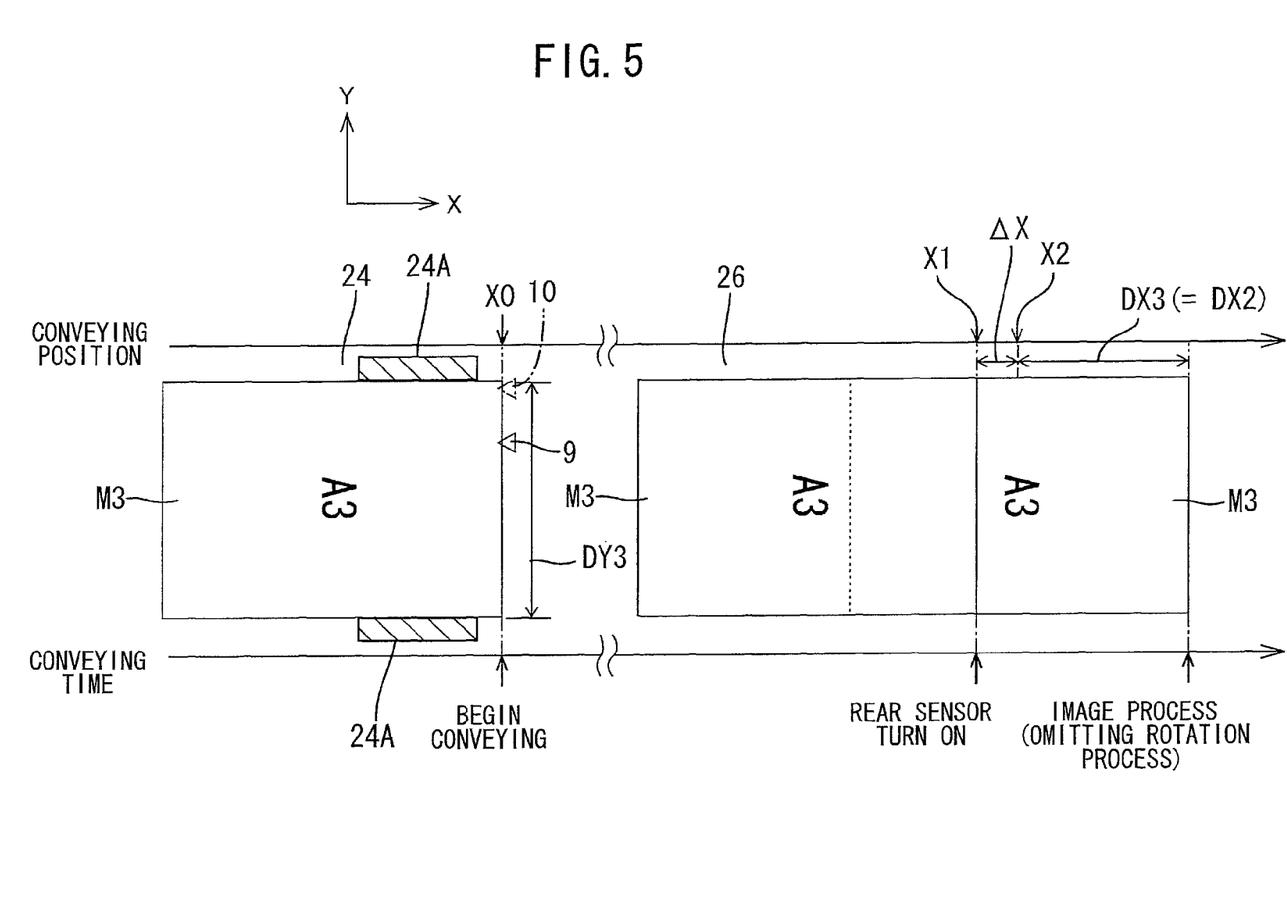
FIG. 5 is an explanatory diagram showing relationships between conveyance positions and conveyance times of A3-size sheet where of the A3-size sheet is arranged in the longitudinal orientation.

FIGS. 3 through 5 show the relationships between conveyance positions of various sheets M and conveyance time. In each drawing, characters depicted in the sheet M to indicate its size (A4 and A3, for example) are oriented to indicate the orientation of an image formed on the sheet M. Therefore, the image formed on each sheet M in the drawings has a portrait orientation in which the height direction is aligned with the long sides of the sheet M. As shown in the drawings, a pair of guide members 24A is disposed on the first tray 24. The guide members 24A can be adjusted to change the distance formed therebetween and function to guide the sheets M as they are conveyed onto the conveying path 26.

Sheets M of various sizes, such as A4-size and A3-size, may be positioned on the first tray 24 in different orientations.

In the example of FIG. 3, an A4-size sheet M1 is arranged in a longitudinal orientation (lengthwise) on the first tray 24. Here, longitudinal orientation indicates that the long sides of the sheet M1 are aligned with a conveying direction X in which the sheet is conveyed along the conveying path 26, orthogonal to the main scanning direction Y of the image-reading unit 3. The sheet M1 is conveyed along the conveying path 26 in this longitudinal orientation.

In the example of FIG. 4, an A4-size sheet M2 is disposed on the first tray 24 in a latitudinal orientation (sideways). Here, a latitudinal orientation indicates that the short sides of the sheet M2 are aligned with the conveying direction X and, hence, orthogonal to the main scanning direction Y. The sheet M2 is conveyed along the conveying path 26 in this latitudinal orientation. In the example of FIG. 5, an A3-size sheet M3 is arranged on the first tray 24 in the longitudinal orientation. This sheet M3 is conveyed along the conveying path 26 in the longitudinal orientation.

Read Control Process

Figure 6:
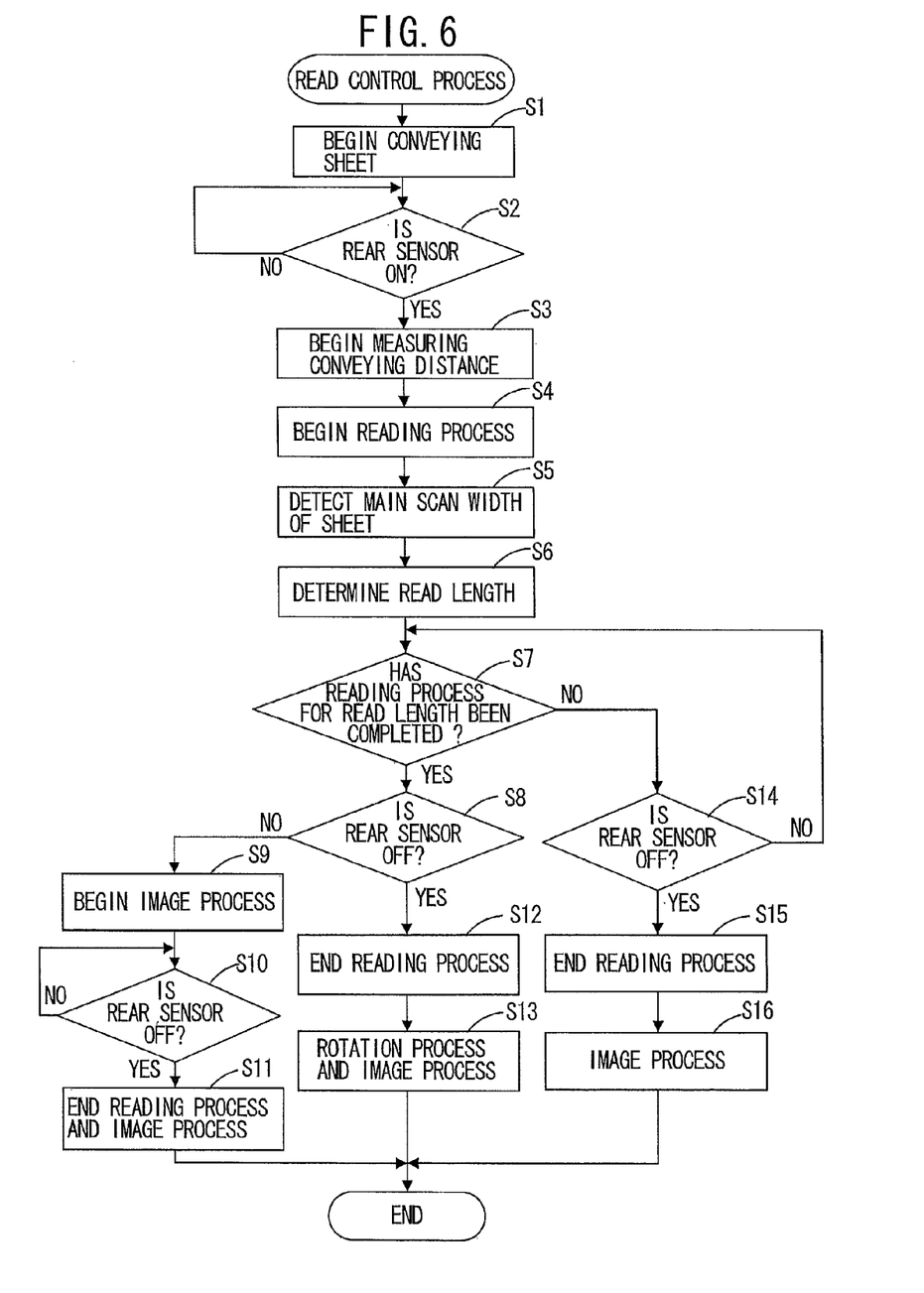
FIG. 6 is a flowchart illustrating steps in a read control process executed by the image reading device according to the first embodiment.

If a user performs an operation on the operating unit 5 to activate the read function, for example, the control unit 2 executes a read control process shown in FIG. 6 when the control unit 2 determines that a sheet M is present in the first tray 24 based on detection results received from the front sensor 8. In the read control process, the control unit 2 determines the orientation of the sheet M being conveyed by the ADF 4 and selects a suitable setting based on the determination results to indicate whether to execute a rotation process on the scanned image.

In S1 of the read control process in FIG. 6, the control unit 2 activates the ADF 4 to begin conveying the sheet M. In S2 the control unit 2 determines whether the leading edge of the sheet M was detected at the detection position X1. Specifically, the CPU 11 of the control unit 2 determines whether the rear sensor 9 turned on, based on detection results received from the rear sensor 9. If the control unit 2 determines that the rear sensor 9 turned on (S2: YES), in S3 the control unit 2 begins measuring the distance that the sheet M is conveyed from the detection position X1.

Various methods may be used to measure the conveying distance. In one method, the CPU 11 measures the conveying distance by counting the number of steps that a drive motor (not shown) rotates when driving the ADF 4 to rotate. In another method, the CPU 11 determines the conveying distance based on the elapsed time from the point that the rear sensor 9 turned on as measured by an internal timer and a predetermined conveyance velocity.

(1) Reading Process

After initiating the operation to measure the conveying distance of the sheet M, in S4 the control unit 2 performs a reading process. In this process, the control unit 2 executes a read operation by controlling light sources in the image-reading unit 3 to emit light, sequentially acquiring read data from the image-reading unit 3 for each main scan line, and storing the scan data in the RAM 13.

(2) Width Detection Process

In S5 the control unit 2 executes a width detection process. This process is performed to detect the width of the sheet M being conveyed on the conveying path 26. Here, "width" denotes the dimension (length) of the sheet M aligned in a direction orthogonal to the conveying path 26, and more accurately the main scanning direction. Hereinafter, this dimension will be referred to as the "main scan width DY."

More specifically, since the reading process on the sheet M was initiated in S4 described above, the CPU 11 can use a leading image corresponding to the leading edge of the sheet M to detect the main scan width DY of the leading edge. For example, the CPU 11 can perform an edge extraction process on the leading edge image of the sheet M based on the scan data acquired in the initial stage of the reading process. In the edge extraction process, pixels whose values differ from neighboring pixels by more than a prescribed value are defined to be edge pixels, and lines formed by at least a prescribed number of these edge pixels are extracted as edge lines. Of the extracted edge lines, the pair of edge lines running parallel to the sub-scanning direction and positioned at opposite sides in the main scanning direction are set as edge lines corresponding to side edges of the sheet M, and the main scan width DY is set to the distance between this pair of edge lines.

Figure 7:
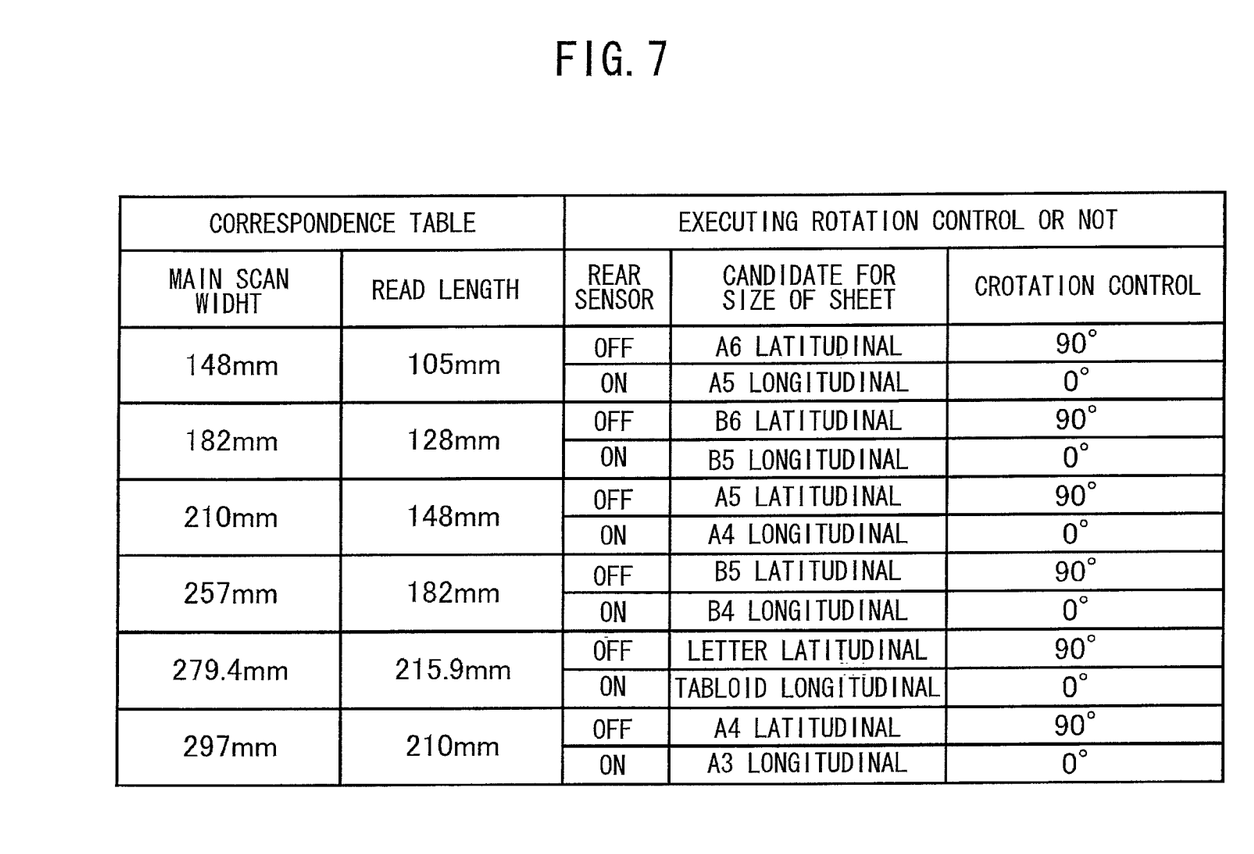
FIG. 7 shows an example of correspondence table stored in the image reading device according to the first embodiment.

After detecting the main scan width DY, in S6 the control unit 2 references a correspondence table, such as that shown in FIG. 7 to set a read length DX corresponding to the detected main scan width DY. The correspondence table is stored in the RAM 13 and correlates main scan widths DY with read lengths DX. The read length DX is the short dimension of a standard size sheet whose long dimension corresponds to the main scan width DY. In other words, the read length DX is equal to a length of short sides of a standard sheet arranged in landscape orientation.

For example, a main scan width DY of 148 mm corresponds to the long side of the standard A6-size sheet. Thus, the short dimension of the A6-size sheet (105 mm) is set as the read length. A main scan width DY of 182 mm corresponds to the long side of the standard B6-size sheet. Thus, the short dimension of the B6-size sheet (128 mm) is set as the read length. A main scan width DY of 210 mm corresponds to the long side of the standard A5-size sheet. Thus, the short dimension of the A5-size sheet (148 mm) is set as the read length. A main scan width DY of 257 mm corresponds to the long side of the standard B5-size sheet. Thus, the short dimension of the B5-size sheet (182 mm) is set as the read length. A main scan width DY of 279.4 mm corresponds to the long side of the standard letter-size sheet. Thus, the short dimension of the letter-size sheet (215.9 mm) is set as the read length. A main scan width DY of 297 mm corresponds to the long side of the standard A4-size sheet. Thus, the short dimension of the A4-size sheet (210 mm) is set as the read length.

(3) Read-Complete Determination Process

After setting the read length DX as described above, in S7 the control unit 2 executes a read-complete determination process. In this process, the CPU 11 determines whether the reading process initiated in S4 for the sheet M currently being conveyed has been performed for the read length DX from the leading edge of the sheet M. In other words, the CPU 11 determines whether or not a predetermined length (DX) worth of an image formed on the sheet M has been read. Specifically, the CPU 11 uses a method of measuring the conveying distance described above to determine whether the leading edge of the sheet M has been conveyed a distance equivalent to the sum of an offset $\Delta X$ and the read length DX.

The offset $\Delta X$ is the distance between the detection position X1 and the read position X2 and is smaller than or equal to the difference in length between the short side of a sheet M that can be set latitudinally (sideways) in the first tray 24 and the long side of a sheet M that can be set longitudinally (lengthwise) in the first tray 24. For example, the smallest standard size sheet that can be set latitudinally in the first tray 24 is the A6-size sheet, and the smallest standard size sheet that can be set longitudinally in the first tray 24 is the A5-size sheet, as indicated in FIG. 7. If the offset $\Delta X$ is no greater than the difference between the short dimension of the A6-size sheet and the long dimension of the A5-size sheet, the rotation control process described next can be applied to sheets M of all standard sizes that can be set in the first tray 24.

(4) Rotation Control Process

The control unit 2 determines that the sheet M is oriented in the longitudinal orientation in which the short side extends in the main scanning direction when the rear sensor 9 is on (S8: NO) upon determining that the reading process has been performed for the read length DX (S7: YES).

(4-1) Longitudinally-Oriented A4-Size Sheet

In the example of FIG. 3, an A4-size sheet M1 is conveyed longitudinally. Consequently, in S5 the CPU 11 detects the main scan width DY1 to be 210 mm and in S6 references the correspondence table in FIG. 7 to set the read length DX1 to 148 mm, which is the short dimension of an A5-size sheet. When the control unit 2 determines that the reading process has been performed on the sheet M1 for the read length DX1 (S7: YES), the leading edge of the sheet M1 will have reached a position downstream from the read position X2 by the read length DX1. However, the rear sensor 9 remains on in this case (S8: NO), indicating that the trailing edge of the sheet M1 has not reached the detection position X1. Accordingly, the control unit 2 can determine that the conveying orientation of the sheet M1 is longitudinal.

When an the sheet is conveyed longitudinally, as in the case of the sheet M1, the image-reading unit 3 sequentially reads the portrait image on the sheet M1 for each main scan line from top to bottom and stores the scan data in the RAM 13. When the scanned image based on the stored data is subsequently displayed on the display unit 6, for example, the orientation of the scanned image is aligned with the orientation of the display unit 6 without undergoing a rotation process. Hence, the scanned image can be presented to the user in the correct orientation.

When the control unit 2 determines that the sheet M1 is conveyed longitudinally, in S9 the control unit 2 controls the image-processing unit 14B of the image processor 14 to initiate image processing on the scan data already stored in the RAM 13 while omitting the rotation process. The control unit 2 ends the reading process upon determining that the rear sensor 9 has turned off (S10: YES). In S11 the image-processing unit 14B completes image processing on all scan data stored in the RAM 13, completing the current read control process.

However, if the control unit 2 determines in S8 that the rear sensor 9 is off (S8: YES) after determining that the reading process was performed for the read length DX (S7: YES), then the control unit 2 determines that the sheet M is being conveyed latitudinally.

(4-2) Latitudinally-Oriented A4-Size Sheet

In the example of FIG. 4, an A4-size sheet M2 is being conveyed latitudinally. Consequently, in S5 the control unit 2 detects the main scan width DY2 to be 297 mm and in S6 references the table in FIG. 7 to set the read length DX2 to 210 mm, which is the short dimension of an A4-size sheet. When the reading process has been performed on the sheet M2 for the read length DX2 (S7: YES), the leading edge of the sheet M2 has reached a position downstream from the read position X2 by the read length DX2. At this time, the trailing edge of the sheet M2 has passed the detection position X1, turning off the rear sensor 9 (S8: YES). Accordingly, the control unit 2 can determine that the sheet M1 is being conveyed latitudinally.

When a sheet M is conveyed latitudinally, as in the example of the sheet M2, the image-reading unit 3 sequentially reads the portrait image formed on the sheet M2 in main scan lines from right to left and stores the scan data in the RAM 13. If this scanned image were to be subsequently displayed on the display unit 6 without undergoing the rotation process, the orientation of the scanned image would be rotated 90 degrees from the display orientation of the display unit 6. In other words, the scanned image would not be displayed in a user-friendly orientation.

Upon determining that the sheet M2 is being conveyed latitudinally, in S12 the control unit 2 ends the reading process. In S13 the control unit 2 controls the image-processing unit 14B of the image processor 14 to execute the rotation process for rotating the scan data stored in the RAM 13 90 degrees and to perform image processes on the rotated scan data. In other words, the scanned image is rotated 90 degrees through the rotation process. After completing the process of S13, the current read control process ends. Through the rotation process of S13, the orientation of the scanned image matches the display orientation of the display unit 6. Hence, the scanned image can be displayed in a user-friendly orientation.

(4-3) Longitudinally-Oriented A3-Size Sheet

In the example of FIG. 5, an A3-size sheet M3 is being conveyed longitudinally. Therefore, in S5 the control unit 2 detects that the main scan width DY3 is 297 mm and references the table in FIG. 7 to set the read length DX3 to 210 mm, which is the same setting made in the example of FIG. 4 and indicates the short dimension of an A4-size sheet. After the reading process has been performed on the sheet M3 for the read length DX3 (S7: YES), the leading edge of the sheet M3 has reached a position downstream from the read position X2 by the read length DX3. However, the trailing edge of the sheet M3 has not reached the detection position X1, leaving the rear sensor 9 on (S8: NO). Accordingly, the control unit 2 can determine that the sheet M3 is being conveyed longitudinally. The remaining process is identical to that described for the example shown in FIG. 3. FIG. 7 shows various combinations of the main scan widths DY, possible sizes of the sheets M, and necessity of the rotation process in addition to the combinations described in FIGS. 3 through 5.

(5) Read-Incomplete Determination Process

In S14 the control unit 2 executes a read-incomplete determination process. In this process, the CPU 11 determines whether the rear sensor 9 turned off before the reading process could be performed for the read length DX, i.e., whether the sheet M is no longer detected while the reading process remains incomplete. If the control unit 2 determines that the reading process is incomplete (S14: YES), indicating that the sheet M has a smaller short side than the standard size, in S15 the control unit 2 ends the reading process, in S16 executes the image process without performing the rotation process, that is, performs the omitting process for omitting the rotation process, and subsequently ends the current read control process. In this case, it is not prudent to perform the rotation process when the sheet M has a nonstandard size with a smaller short side than standard sizes having the same long side.

Effects of the First Embodiment

In the first embodiment described above, if the rear sensor 9 no longer detects the sheet M after the image-reading unit 3 determines that the reading process has been performed reading the portrait image for the read length DX, the image-reading unit 3 determines that the sheet M is being conveyed latitudinally and begins executing the rotation process on the scanned image. However, if the rear sensor 9 still detects the sheet M when the image-reading unit 3 determines that the reading process has been performed for the read length DX, the image-reading unit 3 determines that the sheet M is being conveyed longitudinally and cancels the rotation process on the scanned image. In this way, the image-reading unit 3 can prevent the rotation process from being executed at inappropriate times, even when settings for the size and conveyed orientation of the sheet M are incorrect or nonexistent.

If the main scan width DY is 297 mm, for example, then the possible sizes of the sheet M indicated in FIG. 7 are the A4-size, if the sheet is conveyed latitudinally, and the A3-size, if the sheet is conveyed longitudinally. Here, it is conceivable to use a serial method in which the MFP 1 first performs the reading process over a length equivalent to the long side of an A3-size sheet, regardless of the conveyed orientation of the sheet M, and to subsequently determine whether the rotation process is necessary. However, since the rotation process cannot be started until the reading process has been performed a distance equivalent to the long side of the A3-size sheet in the serial method, the overall process time is longer when the sheet M is an A4-size sheet conveyed latitudinally. However, in the example of FIG. 4 according to the first embodiment, the MFP 1 begins the rotation process upon determining that the reading process has been completed for a distance equivalent to the short dimension of the A4-size sheet. Accordingly, the overall process time is shorter than that in the serial method.

In the width detection process of the first embodiment, the control unit 2 detects the main scan width DY of an image read by the image-reading unit 3 for the leading edge of the sheet M and determines the corresponding read length DX. Hence, the first embodiment reduces the likelihood of the rotation process being performed inappropriately, without requiring the user to set the size of the sheet M and the read length DX, for example. Further, this width detection process can be implemented without providing any special width sensors or the like.

Second Embodiment

Figure 8:
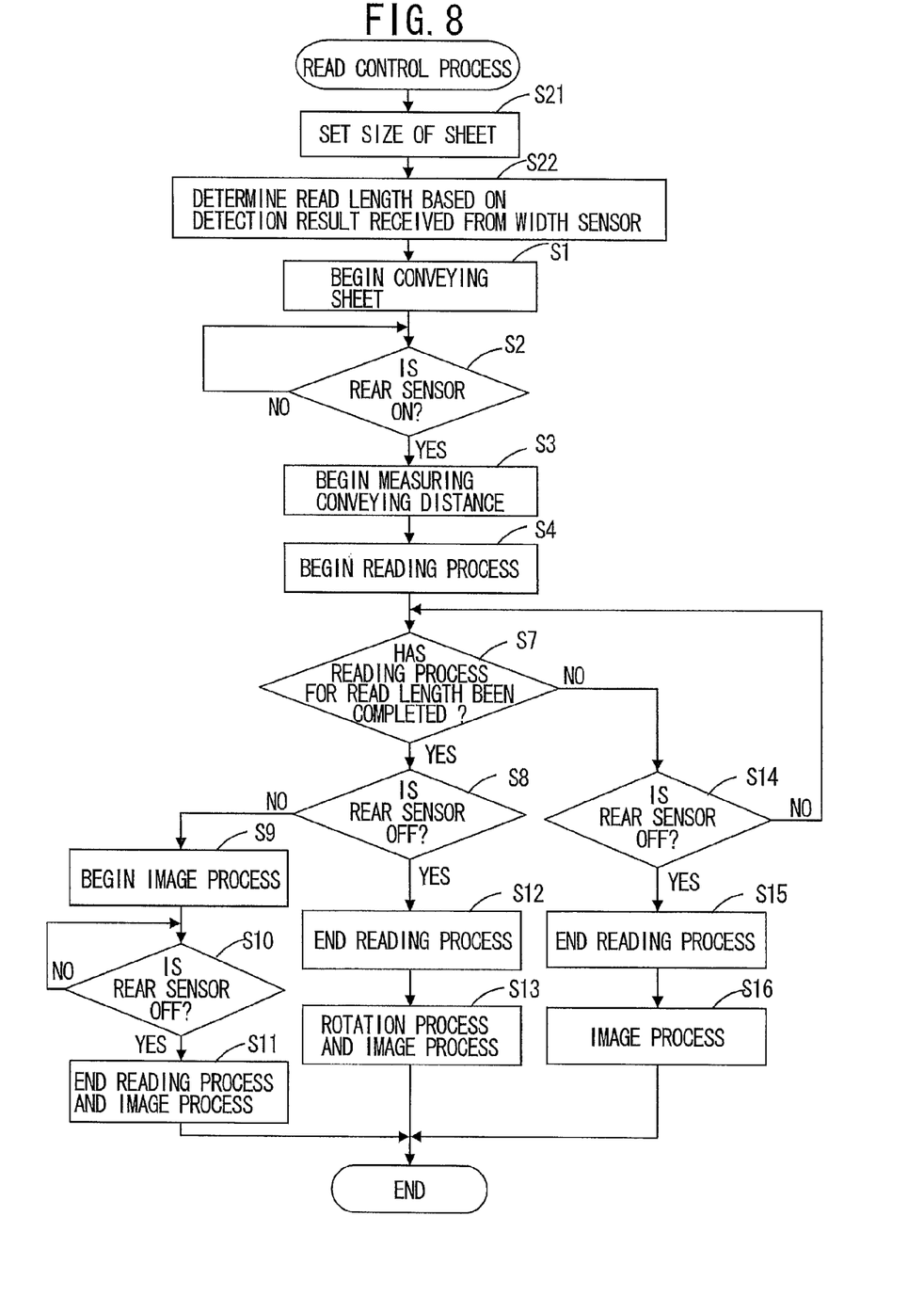
FIG. 8 is a flowchart illustrating steps in a read control process executed by an image reading device according to the second embodiment.

FIG. 8 is a flowchart illustrating steps in a read control process according to a second embodiment of the present invention. The second embodiment is similar to the first embodiment, but differs in the content of the width detection process. Therefore, steps in FIG. 8 similar to those described in the first embodiment will be designated using the same step numbers, and the following description will focus on the points of difference.

In the second embodiment, the MFP 1 is further provided with a width sensor 10 indicated by chain lines in FIGS. 1 and 3 through 5. The width sensor 10 outputs a detection signal based on whether the main scanning width of the sheet M set in the first tray 24 is greater than the short dimension of an A4-size sheet. That is, when the sheet M set in the first tray 24 has a width in the main scanning direction shorter than the short side of an A4-size sheet, the width sensor 10 outputs a detection signal indicating that a sheet is not present (see FIG. 3). When the width of the sheet M in the main scanning direction is greater than the short side of an A4-size sheet, the width sensor 10 outputs a detection signal indicating that an original is present (see FIGS. 4 and 5).

In S21 at the beginning of the read control process of FIG. 8, the control unit 2 prompts the user to set the size of the sheet using the operating unit 5. In S22 the control unit 2 sets the read length based on the detection result received from the width sensor 10. Specifically, when the control unit 2 receives a detection signal from the width sensor 10 indicating that a sheet is not present, the CPU 11 sets the read length to the short dimension of an A5-size sheet. When the control unit 2 receives a detection signal indicating that a sheet is present, the CPU 11 sets the read length to the short dimension of an A4-size sheet. In this way, the control unit 2 can perform the width detection process without executing the edge extraction process and the like described in the first embodiment.

While the invention has been described in detail with reference to the first and second embodiments thereof, it would be apparent to those skilled in the art that various changes and modifications may be made therein without departing from the spirit of the invention.

While the image-reading device in the first and second embodiments is the MFP 1, the image-reading device according to the present invention may be a standalone scanner having only a scanning function or a facsimile device, for example.

In the first and second embodiments, the control unit 2 is configured to execute the read control process using the CPU 11 and image processor 14. However, the control unit 2 may be provided with a plurality of CPUs for executing the read control process, or may execute the process using only a hardware circuit, such as an application-specific integrated circuit. Further, the control unit 2 may be configured such that the CPU 11 executes at least one of the rotation process and image process.

In the first and second embodiments, the rear sensor 9 detects the sheet M. However, the sheet M may be detected by using the reading results of the image-reading unit 3.

In the first and second embodiments, the control unit 2 restricts execution of the rotation process when the sheet M has a nonstandard size with a short side that is smaller than standard sizes having the same long dimension. However, the rotation process may still be implemented as in the example of FIG. 4.

In the first and second embodiments, the control unit 2 detects the lateral dimension of the sheet M in the width detection process and modifies the read length DX based on these results, but the present invention is not limited to this method. For example, the control unit 2 may be configured to set the read length DX to a preset value without executing the width detection process. However, the preferred embodiment can modify the read length DX to a length suitable for the size of the sheet M.

In the examples of the first and second embodiments, the image formed on the sheet M is in portrait orientation. However, the read control process of the invention may also be executed on sheets M whose images are in landscape orientation. In this case, the control unit 2 executes the image process but not the rotation process in S13 of the read control process in FIG. 6 or 8 when the rear sensor 9 is determined to be off (S8: YES) and executes the rotation process in addition to the image process in S9 when the rear sensor 9 is determined to be on (S8: NO). As a result, the scanned image produced from the rotation process is suitably oriented with its orientation orthogonal to the main scanning direction. Accordingly, when the rear sensor 9 turns off prematurely (S14: YES), i.e., when the short side of sheet is smaller than the standard size, in S16 the control unit 2 preferably executes the rotation process in addition to the image process.

Further, in S6 the control unit 2 may determine, based on the reading result, which direction the image formed on the sheet is oriented in. Further, the user input the orientation of the image formed on the sheet via the operating unit 5.

What is claimed is:

1. An image reading device comprising:
    a conveying unit configured to convey a first sheet and a second sheet along a conveying path in a conveying direction, the first sheet having short sides extending in the conveying direction and long sides extending in a main scanning direction perpendicular to the conveying direction, the second sheet having long sides extending in the conveying direction and short sides extending in the main scanning direction, the conveying path having a reading position and a detecting position upstream of the reading position in the conveying direction, a distance between the reading position and the detecting position being smaller than a difference between the short side of the first sheet and the long side of the second sheet;

a reading unit configured to read an image formed on a sheet having reached the reading position;

a sheet-detecting unit configured to detect the sheet having reached the detecting position; and a control unit configured to:
control the reading unit to read the image formed on the sheet being conveyed to generate a read image;
determine whether or not a predetermined length worth of the image has been read; and
rotate the read image in one of: a first case where the detecting unit fails to detect a sheet when the control unit determines that the predetermined length worth of the image has been read; and a second case where the detecting unit detects the sheet when the control unit determines that the predetermined length worth of the image has been read, the read image being not rotated in another of the first case and the second case.

2. The image reading device according to claim 1, wherein the predetermined length is equal to a length of the short side of the first sheet.

3. The image reading device according to claim 1, wherein an image formed on the first sheet is oriented in a direction parallel to a direction in which the long side of the first sheet extends, an image formed on the second sheet being oriented in a direction parallel to a direction in which the long side of the second sheet;
wherein the control unit rotates the read image in the first case;
wherein the control unit does not rotate the read image in the second case.

4. The image reading device according to claim 1, wherein an image formed on the first sheet is oriented in a direction parallel to a direction in which the short side of the first sheet extends, an image formed on the second sheet being oriented in a direction parallel to a direction in which the short side of the second sheet extends;
wherein the control unit rotates the read image in the second case;
wherein the control unit does not rotate the read image in the first case.

5. The image reading device according to claim 1, wherein the control unit is further configured to detect a width of the sheet being conveyed by the conveying unit along the conveying path, the width of the sheet being equal to a length of the sheet in the main scanning direction;

wherein the predetermined length is equal to a length of short side of a standard size sheet whose long side has a length equal to the width of the sheet detected.

6. The image reading device according to claim 5, wherein the read image has a leading image corresponding to a leading part of the sheet;
wherein the control unit detects a width of the leading image in the main scanning direction as the width of the sheet.

7. The image reading device according to claim 5, further comprising a width detecting unit configured to detect the sheet being conveyed by the conveying unit at a position upstream of the detecting position in the conveying direction and output a detecting signal corresponding to the width of the sheet;
wherein the control unit detects the width of the sheet based on the detecting signal.

8. The image reading device according to claim 1, wherein the control unit does not rotate the read image when the detecting unit fails to detect the sheet before the predetermined length worth of the image has been read.

9. The image reading device according to claim 1, wherein the length of the long side of the first sheet is equal to the length of the short side of the second sheet.

10. A non-transitory computer readable medium storing a set of program instructions executed by an image reading device, the program instructions comprising:
controlling a reading unit to read an image formed on a sheet being conveyed by a conveying unit and reached to a reading position to generate a read image, the conveying unit being configured to convey a first sheet and a second sheet along a conveying path in a conveying direction, the first sheet having short sides extending in the conveying direction and long sides extending in a main scanning direction perpendicular to the conveying direction, the second sheet having long sides extending in the conveying direction and short sides extending in the main scanning direction, the conveying path having the reading position and a detecting position upstream of the reading position in the conveying direction, a distance between the reading position and the detecting position being smaller than a difference between the short side of the first sheet and the long side of the second sheet;
determining whether or not a predetermined length worth of the image has been read;
detecting whether or not a sheet is present at the detecting position; and
rotating the read image in one of: a first case where a sheet is not detected when the predetermined length worth of the image has been read; and a second case where the sheet is detected when the predetermined length worth of the image has been read, the read image being not rotated in another of the first case and the second case.

* * * * *